United States Patent [19]

Wada et al.

[11] Patent Number: 4,473,633
[45] Date of Patent: Sep. 25, 1984

[54] LIGHT INFORMATION RECORDING MEDIUM AND LIGHT INFORMATION RECORDING AND READING METHOD

[75] Inventors: Minoru Wada; Yonosuke Takahashi; Eiichi Hasegawa, all of Saitama, Japan

[73] Assignee: Fuji Photo Film Co., Ltd., Kanagawa, Japan

[21] Appl. No.: 450,178

[22] Filed: Dec. 16, 1982

[30] Foreign Application Priority Data

Dec. 16, 1981 [JP] Japan .................. 56-201483

[51] Int. Cl.³ .................. G03C 1/78; G03C 5/04; G01D 15/34
[52] U.S. Cl. .................. 430/271; 430/272; 430/321; 430/346; 430/348; 430/495; 430/945; 346/76 L; 346/135.1
[58] Field of Search .............. 430/945, 321, 346, 348, 430/495, 272, 271; 346/76 L, 135.1

[56] References Cited

U.S. PATENT DOCUMENTS 4,000,492 12/1976 Willens .................. 346/76 L
4,188,214 2/1980 Kido et al. .................. 430/495
4,317,123 2/1982 Namiki et al. .................. 346/135.1

FOREIGN PATENT DOCUMENTS 56-124134 9/1981 Japan .

Primary Examiner—Charles L. Bowers
Attorney, Agent, or Firm—Sughrue, Mion, Zinn, Macpeak & Seas

[57] ABSTRACT

A light information recording medium is disclosed. The medium is comprised of a support which has transparency with respect to light. The support has coated thereon a light sensitive recording layer which contains $SiO_2$ and In at the $SiO_2$ content of 10 to 35 vol. % based on the total volume of $SiO_2$ and In. The recording medium can be used for the recording and reading of the information recorded thereon by striking the medium with laser light from the support side. The recording medium can be used as an optical disk memory having excellent recording sensitivity with respect to laser light, long preservability and high resolving power as well and high S/N ratio.

11 Claims, 2 Drawing Figures

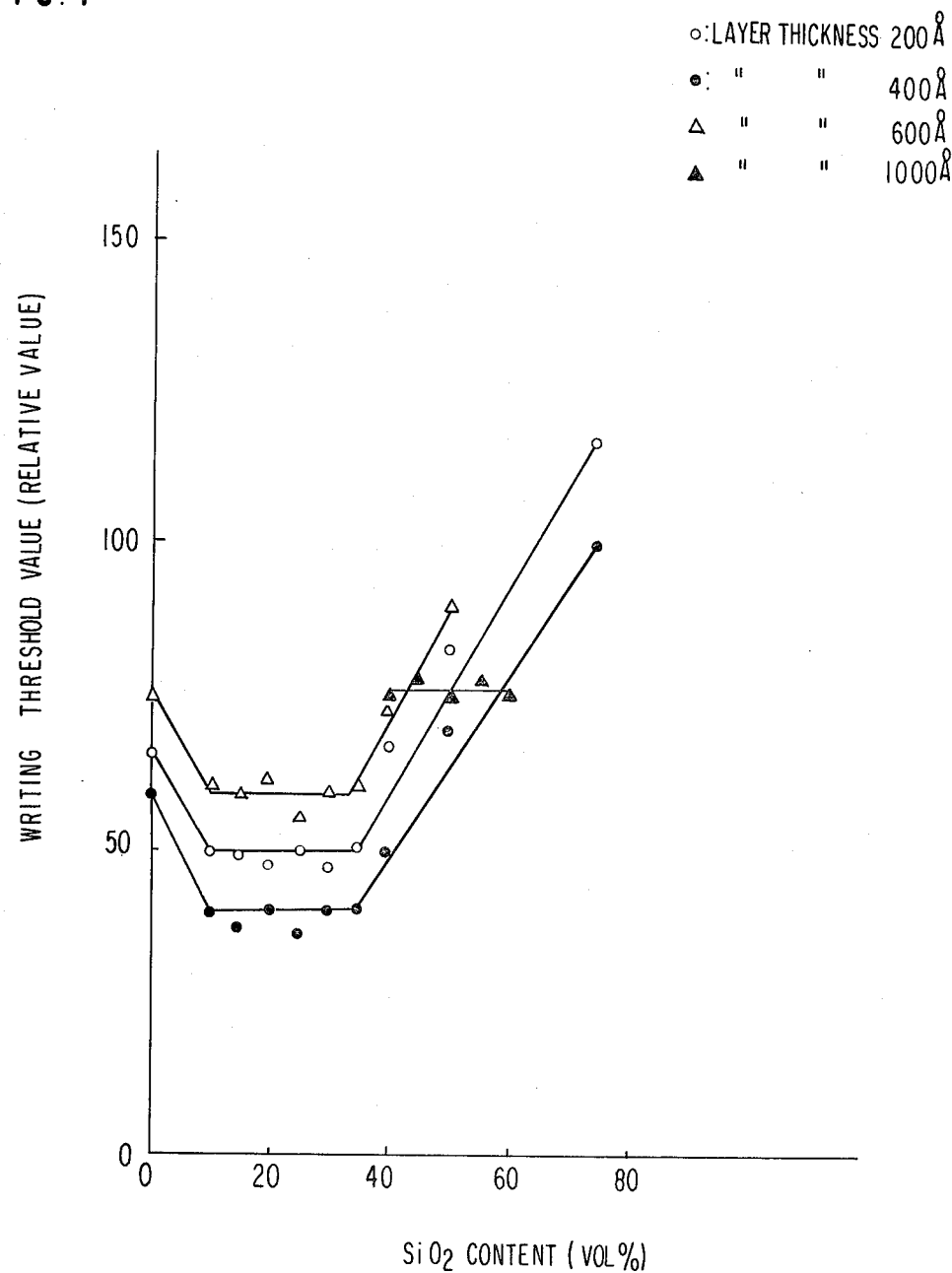

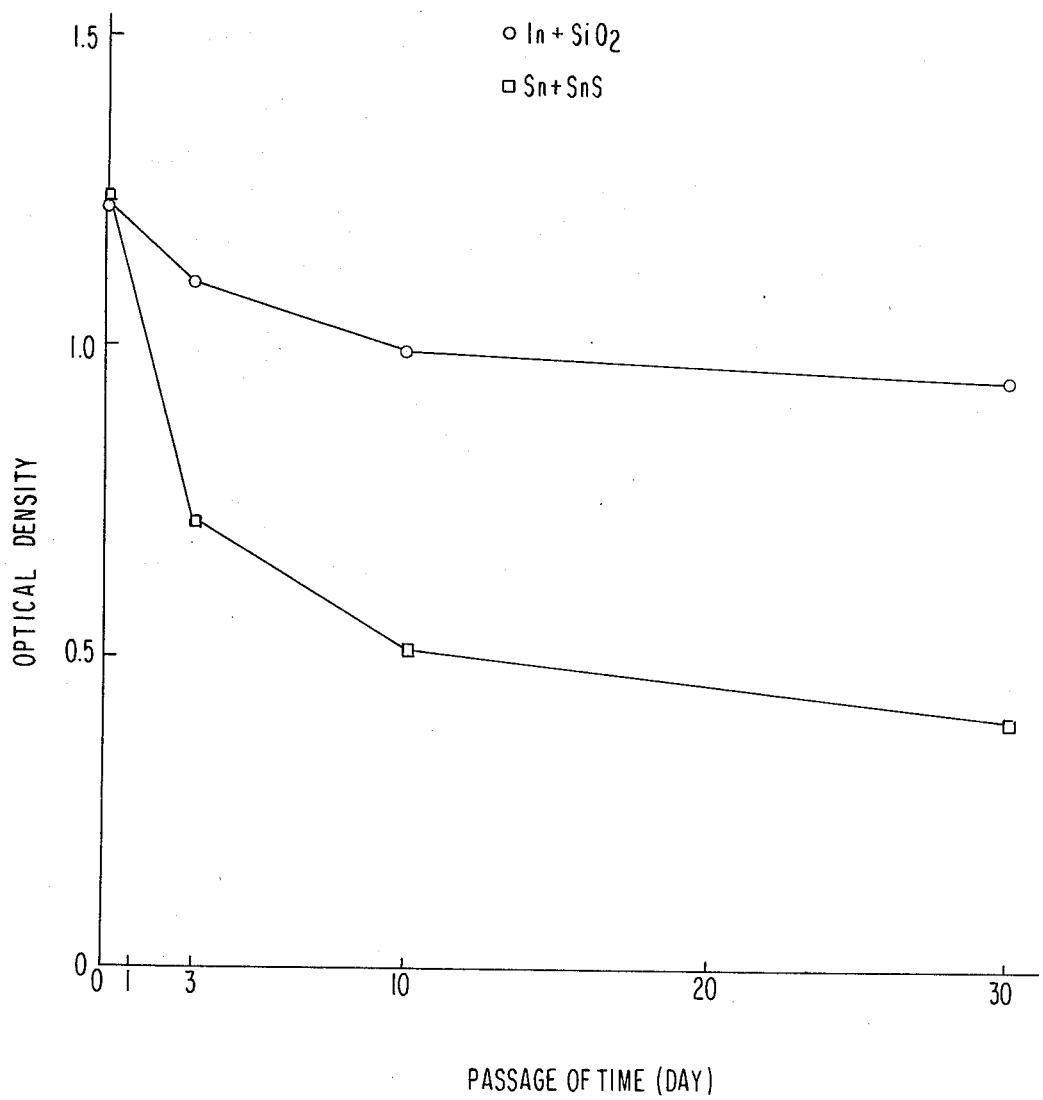

LIGHT INFORMATION RECORDING MEDIUM AND LIGHT INFORMATION RECORDING AND READING METHOD

FIELD OF THE INVENTION

This invention relates to a light information recording medium for recording information using a light beam of high energy density and also to a method of recording and reading the light information using the light information recording medium.

BACKGROUND OF THE INVENTION

Known recording materials for recording information using a light beam of high energy density, such as laser, include thermal recording materials in addition to light sensitive materials using silver salts.

In the thermal recording material, the recording layer has a high optical density and absorbs an irradiated light beam of high energy density causing a local temperature increase which causes thermal deformation such as melting, evaporation and aggregation accordingly, the irradiated portions are removed and change in optical character such as forming a difference in optical density from the unirradiated portions whereby the light information is recorded. Such a thermal recording medium is desirable because the recording material does not need processings such as development and fixing. Further, use of such a recording material does not require work in a dark room since it is not sensitive to ordinary room light. In addition, the recording material provides an image having a high contrast, and it is possible to add information to the recording material.

In general, such a thermal recording material is frequently recorded by converting information to be recorded into electric time series signals and scanning the recording material with a laser beam the intensity of which is modulated according to the signals. This method is desirable because recorded images are obtained at real time.

Since thermal recording material has the unique features as described above, the application of the recording material to various uses such as, for example, substitution for lithographic printing films, fascimile recording materials, photomasks for integrated circuit (IC), microfilms, etc., has been attempted and a part of these applications are now used in practice. Because of having various uses and applications, such recording materials have been actively developed and investigated by many technical groups and various materials such as metals, plastics, dyes, etc., have been proposed as the materials for the recording layers. These materials are practically described in, for example, M. L. Levene et al., Electron Ion and Laser Beam Technology, the record of the 1ith Symposium (1969), Electronics, page 50 (Mar. 18, 1968); D. Maydan, The Bell System Technical Journal, Vol. 50 pages, 1761 (1971); C. O. Carlson, Science, Vol. 154 page, 1550 (1966), U.S. Pat. Nos. 4,291,119, 4,216,501, 4,233,626 and 4,188,214, and British Pat. No. 2,026,346.

In these known techniques, it can be said that every effort has been made to improve the recording sensitivity of the recording materials. Efforts made toward improving the sensitivity of recording materials when using thin metal layers are summarized below.

Recording materials using a thin layer of a metal such as Bi, Sn, In, Al, Cr, etc., have excellent properties such as high resolving power and high contrast. However, many of these recording materials have a light reflectance to laser light of higher than 50% and thus the energy of laser light cannot be effectively utilized by these recording materials. Therefore, the light energy required for recording is large and a laser light source of a high output power is required for recording high-speed scanning, thereby the recording device becomes larger and expensive.

Accordingly, various recording materials having a high recording sensitivity have been investigated. For example, U.S. Pat. No. 3,560,994 describes a recording layer composed of Se, Bi and Ge layers. In this case, the layer of Ge reduces the light reflectance of the layer of Bi to irradiated light, and also the layer of Se is an easily evaporating layer and accelerates the thermal deformation of the Bi layer which is the main recording layer, and the resulting recording layer can record a light information with less energy than when a layer of Bi is used alone. Furthermore, a layer for reducing or preventing light reflection is described in U.S. Pat. No. 4,335,198 and Japanese patent publication No. 14,262/'76. Also, a layer for reducing the thermal conductivity provided between a recording layer and a support is described in Japanese patent application (OPI) No. 12,637/'75 and U.S. Pat. No. 3,911,444. Furthermore, a recording layer composed of a certain kind of metal sulfide, metal fluoride, or metal oxide and a metal as a mixture thereof or as a double layer of them is described in U.S. Pat. No. 4,188,214. Still further, a recording layer composed of a mixture of an inorganic material and an organic material is also disclosed in Japanese patent application (OPI) No. 5742/'79 invented by inventors including some of the inventors of the present application.

As summarized above, various efforts have been made with respect to high sensitization alone and some of such recording materials have been improved to the stage of practical usefulness. The systems which use these recording materials and the circumferential techniques thereof have also progressed in regard to not only the recording materials used for new applications but also the recording materials used for the foregoing conventional purposes. Better properties continue to be required for both new and old applications. In particular, when using a thermal recording material for a new application, such as an optical disc memory, the requirement for better properties is very strong and it is substantially difficult to meet these requirements using conventional recording materials as described above.

The main properties of recording materials required for an optical disc memory are as follows:

(1) the recording material has a high sensitivity enabling high-speed data writing, (2) reflection reading or information is preferred for simplifying the optical system and thus the recording layer must have a high light reflectance for realizing the above requirement, (3) the recording material has chemical stability capable of stably retaining the record information for a long period of time (i.e., archival property of at least 10 years), (4) the recording material has a high resolving power capable of making high density recording, (5) the recording material gives recorded bits of good form for increasing the S/N ratio at reading (for the purpose, ununiformity in granularity of recording layer, etc., is undesirable), (6) the recording material is excellent in production aptitude (for example, the evaporation speed during vapor deposition is stable, and also decomposition, etc., do not occur during vapor deposition), and (7) materials used for the recording material are non-toxic.

There are also many other properties required for such recording materials which are not listed above. Of the foregoing properties, the property (1), i.e., the high sensitivity generally conflicts with the property (2), the high reflectance. Also, it is generally difficult to satisfy the properties such as long stability, nontoxicity, etc., using materials having a relatively high sensitivity, such as a thin Te layer. Also, for high sensitivity, a low-melting metal such as In, Sn, etc., is considered to be preferred but in the case of a one component thin layer or such a metal, the thin layer is liable to take a island-like structure and hence it is difficult to satisfy the property (5) with such a material.

As described above, the materials used for optical disc memory are required to have the very best possible properties and in fact, materials simultaneously satisfying such properties as high sensitivity, long preservability and nontoxicity have not yet been discovered.

Under these circumstances, the inventors have carried out investigations in order to develop thermal recording materials satisfying the aforesaid properties, in particular, thermal recording materials suitable for use as an optical disc memory. During the investigations, it has been discovered that the foregoing properties (1) to (7) are considerably improved by using a recording layer composed of a metal and a non-metallic material formed by simultaneous vapor deposition of the materials as disclosed in U.S. Pat. No. 4,188,214, etc. However, the materials disclosed in the foregoing patent application are not said to have sufficient properties and materials which can satisfy simultaneously the high sensitivity and long stability had at that time not yet been found. Also, Japanese patent application (OPI) No. 124,134/'81 discloses an optical recording medium obtained by vapor-depositing In and $SiO_2$ on a support at the $SiO_2$ content of 40–60 vol % based on the total volume of In and $SiO_2$. However, this recording medium is not desirable because the energy of the laser required for recording is too large and thus a sufficiently high recording speed is not obtained at recording.

SUMMARY OF THE INVENTION

The present inventions have discovered a composition and layer thickness of a recording layer having a higher sensitivity than that of foregoing optical recording media and which has the foregoing properties required for an optical disc memory.

A primary object of this invention is to provide a recording medium for an optical disc memory which is particularly excellent in its recording sensitivity with respect to laser light, has a long preservability and high resolving power, as well as high S/N ratio at reading. In addition, the recording medium for a optical disc can be made at a low cost.

The invention provides a light information recording medium comprising a support having formed thereon a recording layer containing In and $SiO_2$. The medium is used for the recording and reading of information introduced by laser light from the support side. The medium is characterized in that the $SiO_2$ content is 10–35 vol % based on the total volume of In and $SiO_2$. In a preferred embodiment of the light information recording medium of this invention, the thickness of the recording layer is 200–600 Å.

This invention also provides a light information recording and reading method using the foregoing recording medium.

BRIEF DESCRIPTION OF THE DRAWINGS

FIG. 1 is a graph showing the write threshold values of the samples prepared in Example; and FIG. 2 is a graph showing the reduction in optical density by a forcible deterioration test.

DETAILED DESCRIPTION OF THE INVENTION

For satisfying factor (3) of the above-described properties required for optical disc memory, a material which is not easily dissolved in water or oxidized is preferred. For satisfying factor (1), a material which exhibits a high light absorptive faculty in as thin a layer as possible and which is likely to melt upon absorption of laser light is preferred. As such a material, In which has a low melting point (157° C.) and which resists oxidation is suitable. However, In has a high light reflectance. Accordingly, sufficient sensitivity can not be obtained by using In alone. By mixing In with $SiO_2$ having a low light reflectance and good stability, the light reflectance of the combination is decreased and the laser recording sensitivity is increased. However, it must be noted that if the $SiO_2$ content is too large, the sensitivity of the mixture is conversely reduced due to the high melting point (2230° C.) of $SiO_2$.

In an effort to eliminate these faults, Japanese patent application (OPI) No. 124,134/'81 describes that by mixing In with $SiO_2$ having a high chemical stability at the $SiO_2$ content of 40–60 vol %, the sensitivity is increased, the vapor-deposited layer does not have graininess, and a reproduced signal having a high S/N ratio is obtained. However, as the result of further investigating the technique described in the above patent application in detail, the present inventors have concluded that it is difficult to obtain the satisfactory sensitivity and resolving power in the technical range disclosed in the patent application.

The reason is considered to be as follows. In the proposed technique, the $SiO_2$ content is relatively large (higher than 40 vol %) in order to remove the graininess of the vapor-deposited layer and obtain a good reproduced signal. Because of the large content of $SiO_2$, however, when a thin layer (thinner than 1,000 Å) is made of the mixture, the optical density is reduced and the sensitivity is lowered. It is believed that to improve the recording sensitivity and obtain a reproduced signal having a good S/N signal it is necessary to increase the thickness of the layer (beyond 1,000 Å). This causes an increase in optical density preventing a reduction in sensitivity. That is, the foregoing patent application indicates that the optimum composition and layer thickness are 40–60 vol % $SiO_2$ and thicker than 1,000 Å, respectively, for providing a layer quality having no graininess on the surface of the vapor-deposited layer and having good recording sensitivity. In other words, since the $SiO_2$ content is increased in order to obtain a layer quality having no graininess, the sensitivity of the recording layer is reduced. Therefore, the thickness of the recording layer is inevitably increased above 1,000 Å in order to increase the sensitivity. However, when this is done, the resolving power is inferior and a sufficient sensitivity is not obtained merely by increasing the layer thickness.

Therefore, the present inventors made a more detailed investigation over a wider range of the technical ranges disclosed in the foregoing Japanese patent application (OPI) No. 124,134/'81 in order to obtaining a recording medium having good sensitivity, and resolving power. The present inventors have found that when using a relatively thin layer (thickness of thinner than 1,000 Å) the recording sensitivity is greatly increased in a different composition range of $SiO_2$ than that disclosed in the aforesaid patent application. Practically, the $SiO_2$ content should be 10–35 vol %. However, when the composition is in the range of 10–35 vol %, the surface of the recording layer has a graininess as indicated by the inventors of the foregoing patent application. Therefore, after recording, when a laser light read is performed from the vapor-deposited layer side, the reproduced signal is greatly inferior to that when the $SiO_2$ content is higher than 40 vol %.

Therefore, the inventors made various investigations with respect to improving the S/N ratio of the reproduced signal. The present inventors observed the vapor-deposited layer which showed graininess at the exposed surface (opposite to support side) of the layer from the transparent support side and also closely observed the surface (support side) of the vapor-deposited layer peeled apart from the support by means of a mylar tape. As a result of these observations it has been discovered that the absence of graininess is unexpectedly observed at the surface (support side) of the vapor-deposited layer. The absence of graininess gives an expectation that if recording and reading are performed by the incidence of laser light from the support side, the S/N ratio of the reduced signal will be good and by performing the test practically, good results could be obtained. Thus the present invention has been achieved.

More specifically, the present invention is based on the two discoveries that even when a vapor-deposited layer has graininess in the surface opposite to the support side, there is no graininess at the interface between the base plate and the vapor-deposited layer and that the laser sensitivity of a vapor-deposited layer is greatly increased in the layer composition different from a conventional composition at a thickness of the vapor-deposited layer thinner than 1,000 Å. In other words, the invention is a light information recording medium comprising a support having formed thereon a recording layer containing In and $SiO_2$, which performs recording and reading of information by laser light from the support side, characterized in that the $SiO_2$ content in the recording layer is 10–35 vol % based on the total volume of In and $SiO_2$.

Also, in the light information recording material of this invention, it is preferred that the thickness of the recording layer be 200–600 Å.

This invention, further, relates to a light information recording and reading method which comprises recording on the foregoing light recording material by striking the recording material with laser light from the support side thereof and reading the recorded information by striking laser light from the support side thereof.

In this invention, by reducing the $SiO_2$ content as described above and relatively reducing the thickness of the recording layer as in the foregoing preferred embodiment, the sensitivity of the recording layer can be greatly increased as compared to that of conventional recording media. These properties will be understood from the Example which will be described later as well the fact that information can be recorded at a high resolving power by recording thereon with laser light from the support side and also the recorded information can be reproduced at a high S/N ratio by reading the record from the support side.

Writing and reading from the support side are particularly preferred in the case of a so-called air sandwich type structure wherein two supports each having the recording layer are fixed to each other, the recording layers thereof facing with each other, with an air gap between the recording layers as disclosed in U.S. Pat. No. 4,074,282 herein incorporated by reference, and in this case, various merits such as both side recording being possible, etc., can be obtained. The invention is particularly preferably applied to such a construction of recording material.

In this invention the $SiO_2$ content is defined as 10–35 vol %, and the thickness of the recording layer is defined as 200–600 Å in the preferred embodiment. These proportions are maintained for the following reasons:

(1) As will be understood from the Example described later, the sensitivity of the recording layer is particularly improved in the range of 10–35 vol % $SiO_2$. When the $SiO_2$ content is reduced below 10 vol %, turbidity is liable to occur at the interface between the vapor-deposited layer and the support reducing the S/N ratio at reading.

(2) If the thickness of the recording layer is less than 200 Å, the light absorptivity is low and the sensitivity is reduced. If the thickness is greater than 600 Å, the sensitivity and resolving power are reduced.

Examples of support materials used in this invention include plastics such as polyethylene terephthalate, polymethyl methacrylate and copolymers thereof, polycarbonate, etc., and glass.

In order to form the recording layer of this invention, In and $SiO_2$ are simultaneously vapor deposited using a resistance heating vapor evaporation source for In and an electron gun for $SiO_2$ in a vacuum chamber, wherein the vapor evaporation sources are isolated each other using a partition plate so as to accurately monitor each vapor evaporation speed. The mixing ratio of both components is controlled by disposing a quartz oscilation type layer thickness monitor for each vapor evaporation source in vicinity to a support and adjusting each vapor evaporation speed by controlling electric powers applied to the vapor evaporation sources.

In order to further improve the sensitivity of the recording layer of this invention and improve the adhesion between the recording layer and a support, a proper interlayer may be formed between the recording layer and the support by coating, vapor-deposition, etc. Example of preferred materials used for such an interlayer include halogenated polyolefin, halogenated polyhydroxystyrene, chlorinated rubber, nitrocellulose, etc., as well as a non-metallic inorganic material such as SiO and $SiO_2$. The proper thickness of the interlayer is 0.05–5 μm.

In the recording material of this invention, a protective layer composed of an inorganic material or an organic material may be formed on the foregoing recording layer formed on a support. The formation of a protective layer on the recording layer is effective for improving durability of the recording material, the mechanical strength of the recording material, the shelf life of the recording material, etc. The formation of such a protective layer is, as a matter of course, one of the preferred embodiments of this invention.

As the protective layer, an inorganic material or an organic material may be used as described above. The material is required to have good permeability with respect to a light beam having high energy used for recording and reading, have high mechanical strength, have less reactivity with the recording layer, have good coating properties, and easily form the protective layer.

Preferred examples of the inorganic materials used for making the protective layer of this invention are transparent inorganic materials such as $Al_2O_3$, $SiO_2$, $SiO$, $MgO$, $ZnO$, $TiO_2$, $ZrO_2$, $MgF_2$ and $CuF_2$, with $Al_2O_3$, $SiO_2$, $ZrO_2$ and $TiO_2$ being preferred. The protective layer of the inorganic material may be formed by sputttering, ion plating, etc.

It is also preferred to use organic materials for the protective layer. Examples of useful organic materials used for such a protective layer include various resins or polymers such as epoxy resins, styrenic resins, e.g., polystyrene, styrene-maleic anhydride resin, etc.; vinylic resins, e.g., polyvinyl acetate, polyvinyl alcohol, polyvinyl butyral, polyvinyl formal, etc.; methacrylic acid ester series resins, e.g., isobutyl polymethacrylate, methyl polymethacrylate, etc.; amide series resins, e.g., polydiacetonacrylamide, polyacrylamide, etc.; cellulose series resins, e.g., ethyl cellulose, cellulose acetate lactate, cellulose nitrate, diacetyl cellulose, etc.; halogenated polyolefins, e.g., polyvinyl chloride, chlorinated polyethylene, etc.; phenol resins; soluble polyesters; soluble nylons; gelatin; etc., and copolymers of them. Of these, epoxyl resins, methacrylic acid ester series resins and amide series resins are preferably used. These resins are dissolved in various solvents and may be coated as the solution thereof by a known coating method.

Various kinds of solvents can be used for the foregoing purpose. Examples of the solvents include acetone, methyl ethyl ketone, methyl isobutyl ketone, methyl cellosolve, ethyl cellosolve, butyl cellosolve, methyl cellosolve acetate, ethyl cellosolve acetate, butyl cellosolve acetate, hexane, cyclohexane, ethylene chloride, methylene chloride, benzene, chlorobenzene, methanol, ethanol, butanol, petroleum ether, dimethylformamide and thinner. The solvent is selectively used according to the resin used for the protective layer.

The resins described above may contain pigments, matting agents, plasticizers, lubricants, etc., according to the purpose of the protective layer, and in particular, the addition of 0.1-1.0% by weight of higher fatty acid having not less than 11 carbon atoms or an acid amide thereof is effective for improving the surface strength of the recording material. The higher fatty acid or acid amide may also be coated on the protective layer to a thickness of 0.001-1 $\mu$m in an ordinary manner.

The optimum thickness of the protective layer used in this invention may be selected according to the layer strength, shelf life, recording sensitivity, etc., required for the recording material. However, it is particularly preferably for the layer to have a thickness of 0.01-200 $\mu$m.

Another embodiment of the protective layer involves forming the layer in such a manner that an air gap is formed between the recording layer and the protective layer as disclosed in U.S. Pat. No. 4,074,282 herein incorporated by reference. In this embodiment two supports each having the recording layer are fixed with a sealing member between them and with the recording layers in a face-to-face relationship. According to this embodiment both side recording is possible. This embodiment is one of the optimum embodiments of this invention when it is necessary to record a large amount of information with an optical memory disc.

The recording material of this invention is most suitable for optical disc memory as described above. However, the invention is not limited to this use and can be used as substitute for lithographic printing films, as facsimile recording materials, IC photomasks, microfilms, etc.

The invention will now be practically described in the following example.

EXAMPLE

On a polyethylene terephthalate support 100 $\mu$m thick were simultaneously vapor-deposited $SiO_2$ and In under a vacuum of $5\times10^{-5}$ Torr using a resistance heating vapor evaporation source for In and an electron gun for $SiO_2$. The mixing ratio of these components was controlled by disposing a quartz oscillation type layer thickness monitor for each vapor-evaporation source and controlling each vapor deposition speed with monitoring it.

In the manner described above, recording media each having a layer thickness of 200 Å, 400 Å, 600 Å and 1,000 Å with the $SiO_2$ content of 10-75% were obtained.

For purposes of comparison, the same procedure as above was carried out except that a different resistance heating evaporation source was used for each metal and compound. Accordingly, there were prepared recording media each having a mixed layer of Sn and SnS or a mixed layer of In and SnS (layer thickness of 500 Å and SnS content of 20 vol %) as described in Japanese Patent (OPI) No. 20821/'77.

The writing threshold value of each medium having a mixed layer of In and $SiO_2$ was measured using an Ar laser. The results are shown in FIG. 1. When the thickness of the recording layer was less than 600 Å, the recording medium had the minimum value at about the $SiO_2$ content of 10-35 vol %. The value was lower than that of the recording material having the layer thickness of 1,000 Å disclosed in Japanese patent application (OPI) No. 124,134/'81. It was also found that the value was the same as or lower than that of the recording medium having the mixed layer of Sn and SnS.

Furthermore, the recording medium having a mixed layer of In and $SiO_2$ (layer thickness of 400 Å and $SiO_2$ content of 25 vol %) and the recording medium having the mixed layer of Sn and SnS were placed in a chamber maintained at a temperature of 60° C. and a relative humidity of 90%. The change in optical density with the passage of time was then measured. The results are shown in FIG. 2. As is understood from the results, the recording medium having the mixed layer of In and $SiO_2$ showed less reduction in optical density with the passage of time as compared to that of the recording medium having the mixed layer of Sn and SnS. Further when the recording medium having the mixed layer of In and SNS was subjected to the same forcible deterioration test, the formation of a large number of corrosion patterns was obserbed with the passage of time and thus the recording medium could not be practically used. On the other hand, the recording medium having the mixed layer of In and $SiO_2$ was not accompanied by the formation of the foregoing corrosion patterns and the deterioration in surface state was not obserbed in the recording medium.

When the recorded information was read by striking laser light from the support side of the recording medium having the mixed layer of In and SiO$_2$, the S/N ratio was good. Further, when the vapor-deposited layer was peeled apart by means of a mylar tape and the surface (support side) of the vapor-deposited layer was observed by means of SEM, an island-like structure of the vapor-deposited layer was not observed and it was confirmed that the recording medium met the condition of a good S/N ratio.

When the recorded portion of the recording medium having a mixed layer of In and SiO$_2$ was observed by means of SEM, bits of 1 micron were observed, which showed that the resolving power was sufficient.

While the invention has been described in detail and with reference to specific embodiments thereof, it will be apparent to one skilled in the art that various changes and modifications can be made therein without departing from the spirit and scope thereof.

What is claimed is:

1. A light information recording medium, comprising:
   a support having transparency with respect to light; and
   a light sensitive recording layer containing SiO$_2$ and In at the SiO$_2$ content of 10 to 35 vol % based on the total volume of SiO$_2$ and In, wherein the light sensitive recording layer has a thickness of not more than 600 Å.

2. A light information recording medium as claimed in claim 1, wherein the light sensitive recording layer has a thickness within the range of 200 Å to 600 Å.

3. A light information recording medium as claimed in claim 1, further comprising an interlayer positioned between the support and the recording layer.

4. A light information recording medium as claimed in claim 3, wherein the interlayer in comprised of a material selected from the group consisting of halogenated polyolefin, halogenated polyhydroxystyrene, chlorinated rubber, and nitrocellulose.

5. A light information recording medium as claimed in claim 4, wherein the interlayer has a thickness of 0.05 to 5 µm.

6. A light information recording medium as claimed in claim 1, further comprising a protective layer coated over the light sensitive recording layer.

7. A light information recording medium as claimed in claim 6, wherein the protective layer is comprised of a transparent inorganic material selected from the group consisting of Al$_2$O$_3$, SiO$_2$, SiO, MgO, ZnO, TiO$_2$, ZrO$_2$, MgF$_2$ and CuF$_2$.

8. A light information recording medium as claimed in claim 6, further comprising a lubricating layer positioned on the protective layer, wherein the lubricating layer has a thickness of 0.01 to 1 µm.

9. A light information recording medium as claimed in claim 1, wherein two supports each having the light sensitive recording layer are fixed to each other, the recording layers facing with each other, with an air gap between the recording layers.

10. A light information recording and reading method which comprises recording an information or reading a recorded information by striking a recording medium comprising a support having a light sensitive recording layer thereon with laser light from the support side thereof, the light sensitive recording layer containing SiO$_2$ and In at the SiO$_2$ content of 10 to 35 vol % based on the total volume of SiO$_2$ and In, wherein the light sensitive recording layer as a thickness of not more than 600 Å.

11. The method as claimed in claim 10, wherein the thickness of the light sensitive recording layer has a thickness within the range of 200 Å to 600 Å.

* * * * *